US012640327B2

(12) United States Patent
Havla et al.

(10) Patent No.: US 12,640,327 B2
(45) Date of Patent: May 26, 2026

(54) X-RAY TUBE WITH A COOLED GATE ELECTRODE

(71) Applicant: Siemens Healthineers AG, Forchheim (DE)

(72) Inventors: Lukas Havla, Forchheim (DE); Michael Diez, Erlangen (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 0 days.

(21) Appl. No.: 19/254,684

(22) Filed: Jun. 30, 2025

(65) Prior Publication Data

US 2026/0004988 A1 Jan. 1, 2026

(30) Foreign Application Priority Data

Jul. 1, 2024 (DE) ..................... 10 2024 206 132.8

(51) Int. Cl.
*H01J 35/06* (2006.01)

(52) U.S. Cl.
CPC ..... *H01J 35/065* (2013.01); *H01J 2235/1212* (2013.01); *H01J 2235/1262* (2013.01); *H01J 2235/1295* (2013.01)

(58) Field of Classification Search
CPC ............. H01J 35/065; H01J 2235/1212; H01J 2235/1262; H01J 2235/1295
See application file for complete search history.

(56) References Cited

U.S. PATENT DOCUMENTS

| | | | | |
|---|---|---|---|---|
| 1,211,091 A * | 1/1917 | Coolidge | H01J 35/147 378/138 |
| 5,977,693 A | 11/1999 | Nakamoto et al. | |
| 2011/0075814 A1* | 3/2011 | Boese | A61B 6/4441 378/197 |
| 2014/0270087 A1 | 9/2014 | Park et al. | |
| 2014/0291543 A1* | 10/2014 | Sato | H01J 37/3171 427/551 |

(Continued)

FOREIGN PATENT DOCUMENTS

DE 19534576 B4 7/2006

OTHER PUBLICATIONS

German Office Action and English translation thereof for German Application No. 10 2024 206 132.8 mailed Apr. 11, 2025.

(Continued)

*Primary Examiner* — Chih-Cheng Kao
(74) *Attorney, Agent, or Firm* — Harness, Dickey & Pierce, P.L.C.

(57) ABSTRACT

An X-ray tube includes a tube body that encloses a tube volume in a gas-tight manner. An emitter electrode, a gate electrode, and an anode are arranged within the tube volume. The emitter electrode is an unheated electrode having emitter needles in an area facing the gate electrode, which are themselves arranged on a substrate. The arrangement of the emitter electrode and the gate electrode are coordinated such that applying an emission voltage between the emitter electrode and the gate electrode causes electrons to be emitted from the multitude of emitter needles due to the resulting electrical field. The gate electrode is connected with thermal conductivity via a connecting element to a heat sink arranged outside the tube volume.

20 Claims, 4 Drawing Sheets

(56) References Cited

U.S. PATENT DOCUMENTS

| | | | |
|---|---|---|---|
| 2025/0246393 | A1 | 7/2025 | Wimmer et al. |
| 2025/0246394 | A1 | 7/2025 | Wimmer et al. |

OTHER PUBLICATIONS

German Decision to Grant and English translation thereof for German Application No. 10 2024 206 132.8 mailed May 20, 2025.

S. A. Guerrera: "Silicon Field Emitter Arrays With Current Densities Exceeding 100 A/cm2 at Gate Voltages Below 75 V", IEEE Electron Device Letters, vol. 37, Nr. 1, 2016, pp. 96-98.

* cited by examiner

X-RAY TUBE WITH A COOLED GATE ELECTRODE

CROSS-REFERENCE TO RELATED APPLICATION(S)

The present application claims priority under 35 U.S.C. § 119 to German Patent Application No. 10 2024 206 132.8, filed Jul. 1, 2024, the entire contents of which is incorporated herein by reference.

FIELD

One or more example embodiments of the present invention originate from an X-ray tube, wherein the X-ray tube has a tube body enclosing a tube volume in a gas-tight manner, and an emitter electrode, a gate electrode, and an anode are arranged within the tube volume, wherein the emitter electrode is embodied as an unheated electrode, which has a multitude of emitter needles in an area facing the gate electrode, which are themselves arranged on a substrate, and the arrangement of the emitter electrode and of the gate electrode are coordinated in such a way that applying an emission voltage between the emitter electrode and the gate electrode causes electrons to be emitted from the emitter needles due to the resulting electrical field.

BACKGROUND

In conventional X-ray tubes, the tube volume is evacuated. During operation of the X-ray tube, the emitter electrode emits electrons, which are accelerated toward the anode by the gate electrode and generate X-rays there. The gate electrode is usually embodied in a grid-like manner, both in the prior art and within the scope of present invention.

The emitter electrode in particular heats up during operation of the X-ray tube. Current densities are limited as a result. Current densities of up to 3 A/cm2 can be achieved with conventional thermionic emitter electrodes, with which the emitter electrode heats up. In addition to thermionic emitter electrodes, there are also so-called cold emitters, with which the emitter electrode is not heated. With cold emitters, particular use is made of the field effect that occurs at the points of a multitude of emitter needles of the emitter. These are also hereafter referred to as field effect emitters. Cold emitters can usually only achieve lower current densities because of the emitter needles heating up; CNT emitters (CNT=carbon nanotubes) can likewise achieve up to 3 A/cm2, however.

In order to protect a cold emitter from destruction, it is known to provide an overcurrent protection device that limits the current fed to the emitter electrode. Such an overcurrent protection device protects the emitter electrode but does not alter the limitation on current density.

For cold emitters whose emitter needles consist of silicon (Si), current densities of up to 100 A/cm2 are theoretically possible. In practice, however, such a high current density fails because of the aforementioned issue of the emitter needles heating up.

SUMMARY

An object of one or more example embodiments of the present invention is to create opportunities for achieving a higher current density of the emitter electrode.

At least this object is achieved by an X-ray tube having the features as claimed. Advantageous embodiments of the X-ray tube are the subject matter of one or more dependent claims.

According to one or more example embodiments of the present invention, an X-ray tube of the type mentioned in the introduction is embodied in such a way that the gate electrode is connected with thermal conductivity via a connecting element to a heat sink arranged outside the tube volume.

The heat of the field effect emitter electrode can be emitted to the gate electrode via thermal radiation, thermal conduction, or other mechanisms. Due to the thermally conductive connection between the gate electrode and the heat sink, the heat can then be dissipated by the gate electrode from the vacuum. Accordingly, the heat emitted at the gate electrode does not cause overheating and even the destruction of the gate electrode in an extreme case. The field effect emitter electrode is also adequately cooled.

The connecting element advantageously has high thermal conductivity sufficient to facilitate the removal of waste heat from the field effect emitter electrode via the gate electrode. In particular, the connecting element can comprise metallic structures for this purpose.

Thus, a cooling of the gate electrode is achieved, so that the gate electrode remains relatively cold. The gate electrode, which is normally in the immediate vicinity of the emitter electrode, therefore acts as a heat sink for the heat emitted by the emitter electrode. Due to the possibility of heat dissipation via the gate electrode, the emitter electrode can thus be operated with an increased, in particular relatively high, current density.

The emitter needles are preferably embedded in a layer, so that the layer mechanically stabilizes the emitter needles. This can extend the service life of the emitter electrode. Furthermore, contact between the emitter needles and the gate electrode can reliably be avoided.

The layer is preferably embodied as a thermally conductive layer. Brief load peaks in particular can thereby be absorbed by the thermally conductive layer. For example, the layer can contact the emitter needles two-dimensionally, particularly on most of a lateral surface of the respective emitter needle. This facilitates the best possible thermal conductivity between the layer and the respective emitter needle.

The layer is preferably connected to the gate electrode. A thermally conductive connection from the emitter needles can thereby be created via the thermally conductive layer to the gate electrode and from there to the heat sink. Naturally, the thermally conductive layer must be electrically insulating for this purpose. Certain exceptions are explained below.

The gate electrode preferably has pins on its side facing the emitter electrode, which run in parallel to a longitudinal extension of the emitter needles and are embedded in the thermally conductive layer between the emitter needles, so that the pins are connected to the layer with thermal conductivity. This improves the heat transfer from the emitter needles to the gate electrode.

In particular, the pins have a lateral surface, which is in contact with the thermally conductive layer surrounding the pin. The heat transfer from the emitter needles to the gate electrode is thereby improved, because the route of thermal conduction is shortened in the thermally conductive layer, and the heat can be dissipated to the gate electrode more quickly. The pins are preferably embodied in such a way that they, originating from the point of the emitter needles, extend into the thermally conductive layer over a length of at least 20%, advantageously at least 30% and in particular 40% or 50%, of the length of the emitter needles.

The gate electrode is preferably connected to the heat sink via the connecting element not only with thermal conductivity but also with electrical conductivity, and the thermally conductive layer also consists of a material that is electrically insulating at room temperature and that becomes electrically conductive from a limit temperature above room temperature, in particular achieves a predetermined minimum electrical conductivity when the limit temperature is reached.

On the one hand, this embodiment maintains the actually desired electrically insulating behavior of the layer in a normal operation, during which the temperature of the thermally conductive layer does not exceed the limit temperature. If the temperature of the thermally conductive layer does exceed the limit temperature, however, this is because the temperature of the emitter needles is very high. If the thermally conductive layer becomes electrically conductive under these circumstances, the electrical conduction reduces the voltage between the emitter electrode and the gate electrode, so that (further) heating of the emitter needles is counteracted. The electrical behavior of the thermally conductive layer thus leads to automatic protection of the emitter electrode.

The limit temperature can be defined as required. The limit temperature is preferably adjusted to the thermal operating window of the emitter needles. The thermal operating window of the emitter needles depends amongst other things on the emitter current of the respective emitter needle, the dimensioning of the emitter needles, and the boundary conditions for heat dissipation.

The limit temperature of the thermally conductive layer is advantageously selected so that significant electrical conductivity arises, if the temperature of an emitter needle approaches a critical temperature. A “critical temperature” for the emitter needles means a temperature that, if maintained, would cause the destruction of the emitter needle within a brief period, in particular within a few minutes.

Therefore, the limit temperature of the thermally conductive layer is preferably selected so that it is below the critical temperature of the emitter needles, in particular has a gap of 10% to 20% to the critical temperature of the emitter needle. An adequate gap between the limit temperature and the critical temperature of the emitter needles is necessary, so that the conductivity in the entire area between the hot emitter needle and the gate electrode or the pins connected to the gate electrode can adjust and so that the hot emitter needle does not reach or exceed the critical temperature during this time period. Moreover, a gap should be chosen that is small enough to prevent significant conductivity of the thermally conductive layer in normal operation.

The electrical conductivity can be changed in stages or continuously. At the limit temperature, it is advantageous for the thermally conductive layer to have electrical conductivity suitable for absorbing a considerable proportion of the current from the emitter needle, in order to give this thermal relief. It is advantageous in particular that this safeguard acts individually and intrinsically for each emitter needle, as electrical controllability of individual emitter needles is not usually provided. Indeed, these are usually controlled as a whole or as groups of emitter needles with corresponding voltage signals.

Semiconductor materials, for example, can be used as suitable materials with such a temperature-dependent conductivity; they have low conductivity at room temperature, particularly below the limit temperature, and their conductivity rises considerably at the limit temperature, particularly by a factor of 10 to 100, compared to their conductivity at room temperature. When using silicon emitter needles, semiconductor materials that have a larger band gap than silicon can be provided in particular; this applies accordingly to emitter needles made from other semiconductor materials. Additionally, the thermally conductive layer of semiconductor material can be correspondingly p-doped or n-doped, in order to adjust a desired temperature-dependent conductivity.

In order to effect the desired electrical behavior, i.e., an electrically insulating effect at room temperature and electrical conduction above the limit temperature, the layer can consist of a semiconductor material with a band gap that is larger than the band gap of the material used to make the emitter needles. Alternatively, the thermally conductive layer can be embodied as a p-doped or n-doped insulator.

Selenium, gallium arsenide, indium phosphide, or cadmium telluride may be considered by the person skilled in the art as undoped semiconductor materials for the layer. These have a larger band gap than silicon and still achieve good conductivity at increased temperatures. When doped semiconductors are used, semiconductors with larger band gaps can also be used, with which the energy level can be adjusted through p-doping or n-doping, so that a desired conductivity is present when the limit temperature is reached. Such semiconductors are, for example, silicon carbide in different crystal modifications (e.g., 3C, 4H, 6H), titanium dioxide, zinc oxide, zinc sulfide, gallium phosphide, or aluminum arsenide.

A particularly preferable embodiment provides that the X-ray tube has a measuring device, which is used to measure a current flowing via the connecting element from the gate electrode to the heat sink. In this instance, a voltage regulating device is preferably allocated to the X-ray tube, which receives a measured value for the current recorded using the measuring device and which influences an emission voltage present between the emitter electrode and the gate electrode subject to the current. Conceptually, the current that flows via the connecting element can be seen as “leakage current” flowing via the thermally conductive layer. The voltage regulating device can, for example, take corrective action in the voltage present between the emitter electrode and the gate electrode, if and as soon as the “leakage current” exceeds a predetermined threshold. For example, this can trigger the emitter electrode to switch off in this instance. Alternatively, it is also possible to reduce the voltage. The threshold can readily be set at a suitable value above 0.

The threshold can in particular be independent of the emission current of the emitter needles. Ideally, all emitted electrons reach the anode, so that the emission current is the tube current. In practice, however, some of the emitted electrons encounter the gate electrode, causing a leakage current, which reduces the tube current accordingly. The threshold can, for example, be the same as the tube current, i.e., no more than 50% of the emitted electrons may be discharged as leakage current via the gate electrode, and only the remaining electrons form the tube current, which interacts with the anode to generate the X-rays. The threshold can in particular be between 5% and 50% of the emission current, for example, 20% or 35%. The threshold is typically not zero, because it is not possible to prevent a few free electrons of the emission current periodically draining via the gate electrode.

The layer preferably has thermal conductivity that is higher than the thermal conductivity of silicon dioxide. This results in extremely good heat dissipation.

If a temperature-dependent exchange between electrical insulation and electrical conduction is not required or desired, the thermally conductive layer can consist of silicon dioxide ($SiO_2$) or a plastic-based material, particularly a resin. In particular, the arrangement of a plastic-based resin on a silicon dioxide layer can be provided, wherein the plastic-based resin is arranged closer to the gate electrode than the silicon dioxide layer. In other words, the plastic-based resin is arranged on the silicon dioxide layer.

Both silicon dioxide and the plastic-based resin are always electrically insulating regardless of temperature. Additionally, silicon dioxide is a standard material in semiconductor processes, whose properties are well-known and which can readily be produced with silicon-based technology at low expense and using established production lines. One example of a suitable thermally conductive resin is Durapot 865 from Final Advanced Materials GmbH, Basler Straße 115 in 79115 Freiburg, Germany.

The emitter needles preferably form individually controllable groups. On the one hand, this process facilitates flexible operation of the X-ray tube and, on the other, simplifies beam focusing. Individual control of the emitter needle groups can be used to influence the position of the focal spot and the intensity of the electron beams in the focal spot.

The emitter needles preferably consist of silicon (Si). High current density can be achieved as a result—with sufficient cooling. For example, Guerrera et al. disclose silicon field effect emitter microstructures with an electron emission density of over 100 A/cm2 in the scientific paper "Silicon Field Emitter Arrays With Current Densities Exceeding 100 A/cm2 at Gate Voltages Below 75 V," published in IEEE ELECTRON DEVICE LETTERS, VOL. 37, NO. 1, January 2016. However, other materials can also be chosen for the emitter needles, e.g., carbon. For example, compound semiconductors are also a possibility.

It can further be provided that the gate electrode is electrically connected to earth, or is grounded, particularly protectively grounded. The connecting element can also serve this purpose, as long as it offers electrical conductivity.

The connecting element preferably consists of a metal or metal alloy, particularly copper. This results in an extremely good thermal connection between the gate electrode and the heat sink. Moreover, this embodiment enables the gate electrode to be electrically connected to a defined potential via the connecting element, for example, to earth or to ground. In particular, the heat sink can also be grounded. The emission voltage is therefore controlled in particular by applying a variable negative voltage to the emitter electrode, while the gate electrode has a constant potential, in particular is volt-free, i.e., is at ground potential in particular.

The heat sink can be embodied as a metal support structure, for example, which supports the tube body. The metal can in particular be steel or aluminum. Alternatively, the heat sink can be an independent element distinct from the support structure. In this instance, the heat sink likewise usually consists of metal, predominantly aluminum. The tube body itself can also form the heat sink. In all three cases, the heat sink can have elements as needed that increase the cooling effect, for example, cooling ribs and/or forced ventilation through a ventilator or similar.

In a particularly preferable embodiment, it is provided that the gate electrode and the heat sink are embodied in such a way that the heat can be dissipated from the gate electrode and fed to the heat sink via a coolant carried in a cooling channel, wherein the cooling channel is embodied as a closed circuit between the gate electrode and heat sink. The cooling channel can in particular be encompassed by the connecting element and/or be arranged on the connecting element. This enhances the cooling effect even further. The gate electrode, the heat sink, and the cooling channel are completely gas-tight. For example, the gate electrode and the heat sink can be embodied as hollow parts, which are connected to each other via the wires arranged in the connecting element, so that the coolant can circulate from the gate electrode to the heat sink and back. The coolant can be defined as required. The coolant can, for example, act like so-called two-phase cooling in accordance with the capillary effect.

BRIEF DESCRIPTION OF THE DRAWINGS

The characteristics, features, and advantages of this invention described above, as well as the manner in which they are achieved, become clearer and more understandable in connection with the following description of the exemplary embodiments, which are explained in more detail in conjunction with the drawings. Schematic representations are provided as follows.

DETAILED DESCRIPTION

Figure 1:
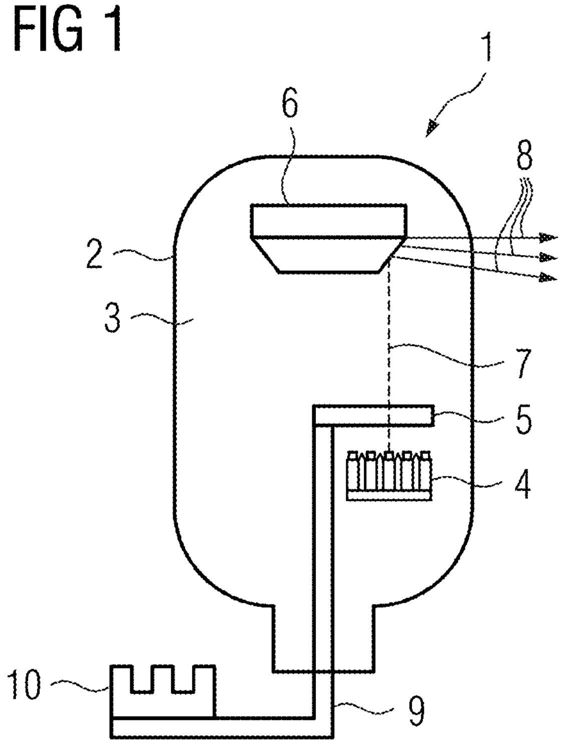
FIG. 1 an X-ray tube.

According to FIG. 1, an X-ray tube 1 has a tube body 2. The tube body 2 can consist of glass, for example. The tube body 2 encloses a tube volume 3 in a gas-tight manner. The tube volume 3 is evacuated. An emitter electrode 4, a gate electrode 5, and an anode 6 are arranged within the tube volume 3 (amongst other things). The gate electrode 5 is arranged between the emitter electrode 4 and the anode 6, usually in the immediate vicinity of the emitter electrode 4. The gate electrode 5 is usually embodied in a grid-like manner. The anode 6 can be embodied as a conventional rotating anode. The electrodes 4 and 6 are connected to electronics arranged outside the tube volume 3 via electrical wires (not shown). During operation, the emitter electrode 4 emits electrons 7, which are accelerated toward the anode 6 by high voltage present between the emitter electrode 4 and the anode 6 and generate X-rays 8 there.

Figure 2:
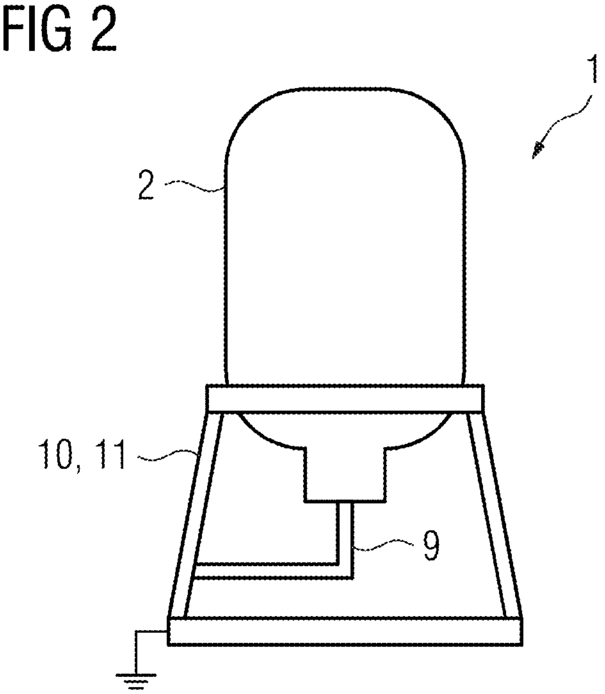
FIG. 2 an X-ray tube, which is held in a support structure.

The gate electrode 5 is connected with thermal conductivity via a connecting element 9 to a heat sink 10. The heat sink 10 is arranged outside the tube volume 3. In accordance with the schematic representation in FIG. 2, the heat sink 10 can be embodied as a support structure 11, which supports the X-ray tube 1. Alternatively, in accordance with the schematic representation in FIG. 1, the heat sink 10 can be an independent element distinct from the support structure 11. In the former instance, the heat sink 10 usually consists of metal, particularly steel or aluminum. In the latter instance, the heat sink 10 usually consists of metal, predominantly aluminum. In both instances, the heat sink 10 can be embodied in such a way that it has the largest possible cooling surface to the surroundings. For example, the heat sink 10 can have cooling ribs. Furthermore, the tube body 2 itself can also act as a heat sink 10.

It is particularly preferably for the gate electrode 5 to be connected to the heat sink 10 via the connecting element 9 not only with thermal conductivity but also with electrical conductivity. For example, the connecting element 9 can consist of a metal or metal alloy, particularly copper, but also aluminum in individual cases. The heat sink 10 and thus also the gate electrode 5 are preferably connected to the constant ground potential. If the tube body 2 forms the heat sink 10, the tube body 2 can be coated on the outside with a metal layer, for example.

Figure 3:
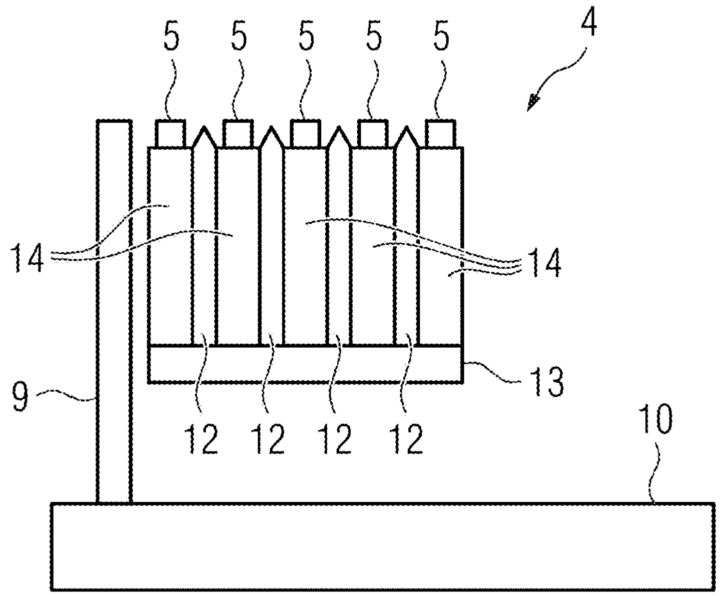
FIG. 3 an electrode arrangement.

According to FIG. 3, the emitter electrode 4 is embodied as an unheated electrode, thus as a so-called cold emitter. It has a multitude of emitter needles 12 in an area facing the gate electrode 5. The emitter needles 12 are themselves arranged on a substrate 13. The emitter needles 12 preferably consist of a silicon Si. The arrangement of the emitter electrode 4 and of the gate electrode 5 are coordinated in such a way that applying an emission voltage U' between the emitter electrode 4 and the gate electrode 5 causes electrons to be emitted from the emitter needles 12 due to the resulting electrical field. If the emission voltage U' between the emitter needles 12 of the emitter electrode 4 and the gate electrode 5 is high enough, the emitter needles 12 thus emit free electrons in the area between the emitter needles 12 and the gate electrode 5, so that these electrons can then be accelerated toward the anode 6.

Figure 4:
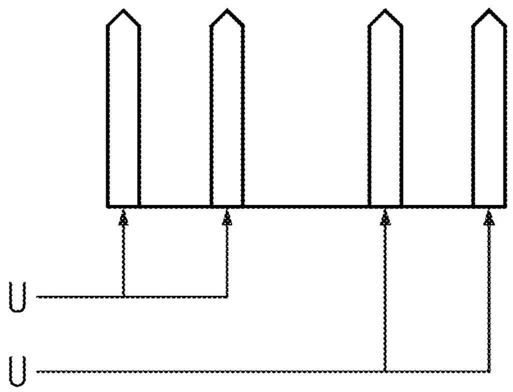
FIG. 4 groups of emitter needles and their control.

It is possible that the emitter needles 12 are always controlled uniformly. In accordance with the representation in FIG. 4, however, the emitter needles 12 preferably form individually controllable groups. Each group of emitter needles 12 can be supplied with its own operating voltage U. The number of groups of emitter needles 12 shown in FIG. 4 is purely an example. Considerably more than the two groups of emitter needles 12 shown are usually present. Likewise, the number of emitter needles 12 shown per group in FIG. 4 is also purely an example. The groups usually comprise considerably more emitter needles 12.

In accordance with the representation in FIG. 3, the emitter needles 12 are preferably embedded in a layer 14. The layer 14 preferably has good thermal conductivity. It is possible for the layer 14 to consist of silicon dioxide ($SiO2$) or a plastic-based material, particularly a resin. In both these cases, the thermally conductive layer 14 is always electrically insulating regardless of its temperature. The layer 14 can also consist of other materials. In this instance, the layer 14 can in particular have thermal conductivity that is higher than the thermal conductivity of silicon dioxide.

Figure 5:
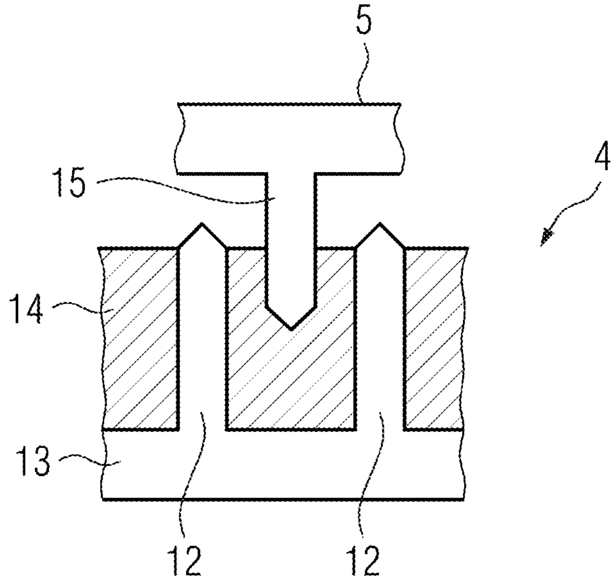
FIG. 5 a section of an emitter electrode, a gate electrode, and a thermally conductive layer, FIG. 6 a block diagram and FIG. 7 a gate electrode, a heat sink, and a connecting element.

The layer 14 is preferably connected to the gate electrode 5, see, for example, according to FIG. 3 with thermal conductivity from the emitter needles 12 via the layer 14 to the gate electrode 5. In particular, the gate electrode 5 can have pins 15 on its side facing the emitter electrode 4 in accordance with the representation in FIG. 5. The pins 15 run in this instance in parallel to a longitudinal extension of the emitter needles 12. They are embedded between the emitter needles 12 in the thermally conductive layer 14. In the case of the thermally conductive, and thus in particular also mechanical, connection of the thermally conductive layer 14 and the gate electrode 5, the thermally conductive layer 14 preferably consists of a material that is electrically insulating at room temperature and electrically conductive from a limit temperature above room temperature. For example, the thermally conductive layer 14 can consist of a semiconductor material with a large band gap or can be embodied as a p-doped or n-doped insulator.

The gate electrode 5 must be open. This is because the area above the points of the emitter needles 12 must remain clear, as otherwise the electrons could not be sucked away toward the anode 6. The gate electrode 5 is thus only arranged between the points of the emitter needles 12 and has breakthroughs or openings above the points of the emitter needles 12. The layer 14 in contrast can be adjacent to the underside of the gate electrode 5.

Figure 6:
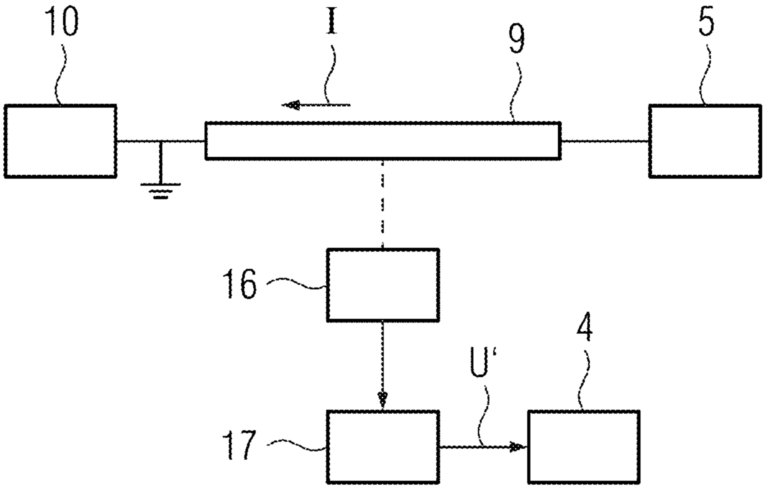

In the event that the layer 14 is embodied in such a way that it is electrically conductive above the limit temperature, the X-ray tube 1 preferably has a measuring device 16 according to FIG. 6. The measuring device 16 is used to measure a current I, which flows via the connecting element 9 from the gate electrode 5 to the heat sink 10. A voltage regulating device 17 is also allocated to the X-ray tube 1 in this instance. A measured value for the current I recorded using the measuring device 16 is fed to the voltage regulating device 17. The voltage regulating device 17 influences in this instance the emission voltage U' present between the emitter electrode 4 and the gate electrode 5 subject to the current I.

Figure 7:
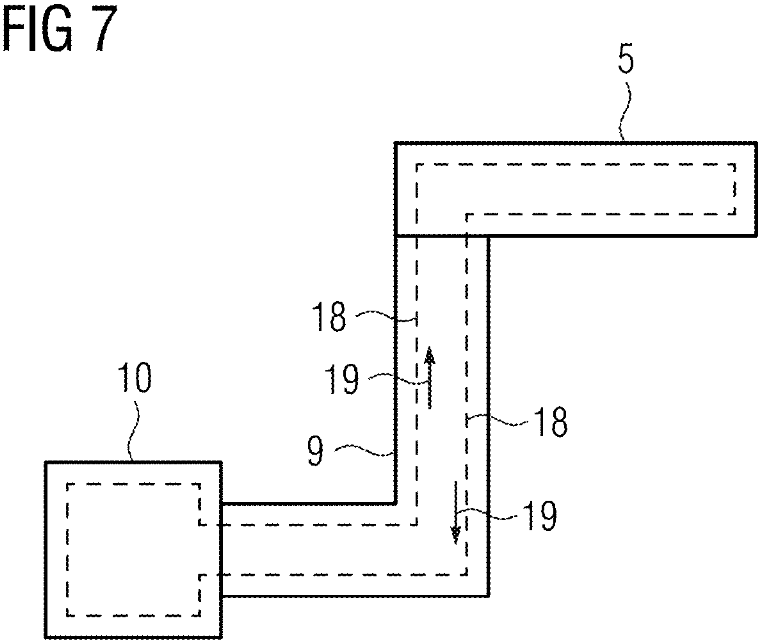

In order to optimize the cooling of the gate electrode 5, it is possible for the gate electrode 5 and the heat sink 10 to be embodied as hollow parts in accordance with the representation in FIG. 7. In this instance, the gate electrode 5 and the heat sink 10 are connected to each other via wires 18, which are arranged in the connecting element 9. As a result, a coolant 19 is able to circulate in a closed circuit from the gate electrode 5 to the heat sink 10 and back.

Embodiments of the present invention have many advantages. In particular, a higher current density can be achieved by cooling the emitter electrode 4. This is particularly advantageous in connection with a cold emitter. Due to the possibility of providing multiple groups of emitter needles 12 with the cold emitter, the X-rays can also be influenced through position-dependent control of the emitter electrode 4.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing embodiments. The present invention may, however, be embodied in many alternate forms and should not be construed as limited to only the embodiments set forth herein.

Although the present invention has been illustrated and described in more detail by preferred exemplary embodiments, this shall not limit the present invention to the disclosed examples, and other variations may be deduced from these by the person skilled in the art without extending beyond the scope of protection of the present invention.

Independent of the grammatical term usage, individuals with male, female or other gender identities are included within the term.

What is claimed is:

1. An X-ray tube, comprising:
- a tube body enclosing a tube volume in a gas-tight manner; and
- an emitter electrode, a gate electrode, and an anode arranged within the tube volume; wherein
  - the emitter electrode is an unheated electrode, which has a multitude of emitter needles in an area facing the gate electrode, the multitude of emitter needles being arranged on a substrate,
  - an arrangement of the emitter electrode and the gate electrode is coordinated such that applying an emission voltage between the emitter electrode and the gate electrode causes electrons to be emitted from the multitude of emitter needles due to a resulting electrical field,
  - the gate electrode is connected, with thermal conductivity via a connecting element, to a heat sink arranged outside the tube volume,
  - the gate electrode has pins on a side facing the emitter electrode,
  - the multitude of emitter needles are embedded in a layer such that the layer mechanically stabilizes the multitude of emitter needles, and
  - the layer is a thermally conductive layer.

2. The X-ray tube as claimed in claim 1, wherein the layer is connected to the gate electrode.

3. The X-ray tube as claimed in claim 2, wherein
- the pins run parallel to a longitudinal extension of the multitude of emitter needles, and
- the pins are embedded in the layer between the multitude of emitter needles such that the pins are connected to the layer with thermal conductivity.

4. The X-ray tube as claimed in claim 3, wherein the gate electrode is connected, via the connecting element, to the heat sink with thermal conductivity and with electrical conductivity, and the layer includes a material that is electrically insulating at room temperature and electrically conductive from a limit temperature above room temperature.

5. The X-ray tube as claimed in claim 2, wherein the gate electrode is connected, via the connecting element, to the heat sink with thermal conductivity and with electrical conductivity, and the layer includes a material that is electrically insulating at room temperature and electrically conductive from a limit temperature above room temperature.

6. The X-ray tube as claimed in claim 5, wherein the layer includes a semiconductor material with a band gap that is larger than a band gap of a material used for the multitude of emitter needles, or the layer is a p-doped or n-doped insulator.

7. The X-ray tube as claimed in claim 6, further comprising:

a measuring device configured to measure a current flowing, via the connecting element, from the gate electrode to the heat sink; wherein a voltage regulating device is allocated to the X-ray tube, the voltage regulating device being configured to receive a measured value for the current measured by the measuring device, and to influence an emission voltage present between the emitter electrode and the gate electrode subject to the current.

8. The X-ray tube as claimed in claim 7, wherein the layer has a thermal conductivity that is higher than a thermal conductivity of silicon dioxide.

9. The X-ray tube as claimed in claim 7, wherein the multitude of emitter needles form multiple individually controllable groups.

10. The X-ray tube as claimed in claim 5, further comprising:

a measuring device configured to measure a current flowing, via the connecting element, from the gate electrode to the heat sink; wherein a voltage regulating device is allocated to the X-ray tube, the voltage regulating device being configured to receive a measured value for the current measured by the measuring device, and to influence an emission voltage present between the emitter electrode and the gate electrode subject to the current.

11. The X-ray tube as claimed in claim 1, wherein the layer has a thermal conductivity that is higher than a thermal conductivity of silicon dioxide.

12. The X-ray tube as claimed in claim 1, wherein the layer includes silicon dioxide or a plastic-based material.

13. The X-ray tube as claimed in claim 12, wherein the plastic-based material is a resin.

14. The X-ray tube as claimed in claim 1, wherein the multitude of emitter needles form multiple individually controllable groups.

15. The X-ray tube as claimed in claim 1, wherein the multitude of emitter needles include silicon.

16. The X-ray tube as claimed in claim 1, wherein the connecting element includes a metal or metal alloy.

17. The X-ray tube as claimed in claim 1, wherein the heat sink is a support structure made from metal and is configured to support the tube body, or is an independent element distinct from a support structure, or the tube body forms the heat sink.

18. The X-ray tube as claimed in claim 17, wherein the metal is steel or aluminum.

19. The X-ray tube as claimed in claim 1, wherein the gate electrode and the heat sink are configured such that heat is dissipated from the gate electrode and fed to the heat sink via a coolant carried in a cooling channel, the cooling channel is a closed circuit between the gate electrode and the heat sink, and the cooling channel is at least one of encompassed by the connecting element or arranged on the connecting element.

20. The X-ray tube as claimed in claim 1, wherein the connecting element includes copper.

* * * * *